(12) United States Patent
Sugumar et al.

(10) Patent No.: US 7,350,053 B1
(45) Date of Patent: Mar. 25, 2008

(54) SOFTWARE ACCESSIBLE FAST VA TO PA TRANSLATION

(75) Inventors: Rabin A. Sugumar, Sunnyvale, CA (US); Robert T. Golla, Austin, TX (US); Paul J. Jordan, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 106 days.

(21) Appl. No.: 11/034,345

(22) Filed: Jan. 11, 2005

(51) Int. Cl.
  *G06F 9/26* (2006.01)
  *G06F 9/34* (2006.01)
  *G06F 12/00* (2006.01)

(52) U.S. Cl. .................. 711/207; 711/205; 711/208; 711/221

(58) Field of Classification Search ............ 711/206, 711/207
See application file for complete search history.

(56) References Cited

U.S. PATENT DOCUMENTS

| | | | |
|---|---|---|---|
| 5,873,123 A * | 2/1999 | Patel et al. ............... | 711/202 |
| 6,456,891 B1 * | 9/2002 | Kranich et al. ............ | 700/2 |
| 6,681,311 B2 * | 1/2004 | Gaskins et al. ............ | 711/203 |
| 2004/0139295 A1 * | 7/2004 | Arimilli et al. ........... | 711/207 |

OTHER PUBLICATIONS

Saulsbury, Ashley. "Recency-Based TLB Preloading". 2000. ACM.*

* cited by examiner

Primary Examiner—Brian R. Peugh
Assistant Examiner—Ryan Bertram
(74) Attorney, Agent, or Firm—Martine Penilla & Gencarella, LLP

(57) ABSTRACT

A method to communicate data is disclosed which includes communicating a virtual address to a translation lookaside buffer (TLB) and translating the virtual address to a physical address of a computer memory. The method also includes loading the physical address translated by the TLB into a register within a processor and transmitting the data from the physical address to a destination computing device.

15 Claims, 8 Drawing Sheets

SOFTWARE ACCESSIBLE FAST VA TO PA TRANSLATION

BACKGROUND OF THE INVENTION

1. Field of the Invention

The present invention relates to data transmission, and more specifically to virtual address to physical address translation.

2. Description of the Related Art

In the computing environment, data must be transmitted between different computer components as well as between computers in a network structure. Often, data used by a central processing unit (CPU) within a computer are allocated virtual addresses (VA) for ease and flexibility of use and processing. In one example, data may have virtual addresses corresponding to physical memory addresses (PA) located within a random access memory (RAM). Unfortunately, during a data transfer to a location outside of the CPU, such as a data transmission to another computer over a network using an entity such as, for example, an input/output card, the input/output card needs the physical address of the data that is to be transferred. But since such an entity generally does not have access to hardware VA to PA translation, translating a VA to PA generally takes a substantial period of time. This can result in a great impact on performance especially when the VA to PA translation has to be repeated many times to transfer large quantities of data.

Accordingly, what is needed is an apparatus and a method to increase the speed of VA to PA translation.

SUMMARY OF THE INVENTION

Broadly speaking, the present invention is an apparatus and a method for accelerating virtual address to physical address translation to expedite the data transmission. It should be appreciated that the present invention can be implemented in numerous ways, such as a process, an apparatus, a system, a device or a method on a computer readable medium. Several inventive embodiments of the present invention are described below.

In one embodiment, a method to communicate data is disclosed which includes communicating a virtual address to a translation lookaside buffer (TLB) and translating the virtual address to a physical address of a computer memory. The method also includes loading the physical address translated by the TLB into a register within a processor and transmitting the data from the physical address to a destination computing device.

In another embodiment, a method to communicate data is provided. The method includes allocating a virtual address corresponding to a computer memory and translating the virtual address to a physical address of the computer memory through a translation lookaside buffer (TLB). The method also includes storing the physical address of the computer memory into a physical address of a memory space within the input/output unit and receiving data from a sending computing apparatus. The method further includes storing the received data to the physical address of the computer memory.

In yet another embodiment, a method to communicate data is provided which includes providing a virtual address for the data and translating the virtual address to a physical address of a computer memory by use of a translation lookaside buffer (TLB). The method further includes loading the physical address translated by the TLB into a register within a processor and storing the physical address into an input/output unit for use in data communication.

In another embodiment, a computer readable media having program instructions for communicating data is provided which includes program instructions for providing a virtual address for the data and program instructions for converting the virtual address to a physical address of a computer memory by use of a translation lookaside buffer (TLB). The computer readable media further includes program instructions for loading the physical address translated by the TLB into a register within a processor and program instructions for storing the physical address into an input/output unit for use in data communication.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The following embodiments describe a method for translating a virtual address of data to a physical address using a translation lookaside buffer. It will be obvious, however, to one skilled in the art, that the present invention may be practiced without some or all of these specific details. In other instances, well known process operations have not been described in detail in order not to unnecessarily obscure the present invention.

In one embodiment, the CPU pipeline can obtain the physical address for a given virtual address by explicitly accessing the translation lookaside buffer (TLB) using a special form of load instruction. The physical address thus obtained may be used to program an input/output (I/O) unit such as, for example, a network interface card (NIC). In another embodiment, the I/O unit may exist on chip. Subsequently, the I/O unit can read data from system memory starting at the physical address and transfer data over the network.

Obtaining the physical address (PA) for a given virtual address (VA) as generally done requires the execution of large numbers of software instructions. The present invention may accomplish this in hardware to greatly improve communication speed. Also, VA to PA translation using a TLB may be done as part of regular stores and loads to and from system memory, but the resulting PA is generally not observable by the pipeline. The present invention as described herein intelligently utilizes TLB-based VA to PA translation to expose the translation back to the pipeline so it may be used to program I/O devices.

Figure 1A:
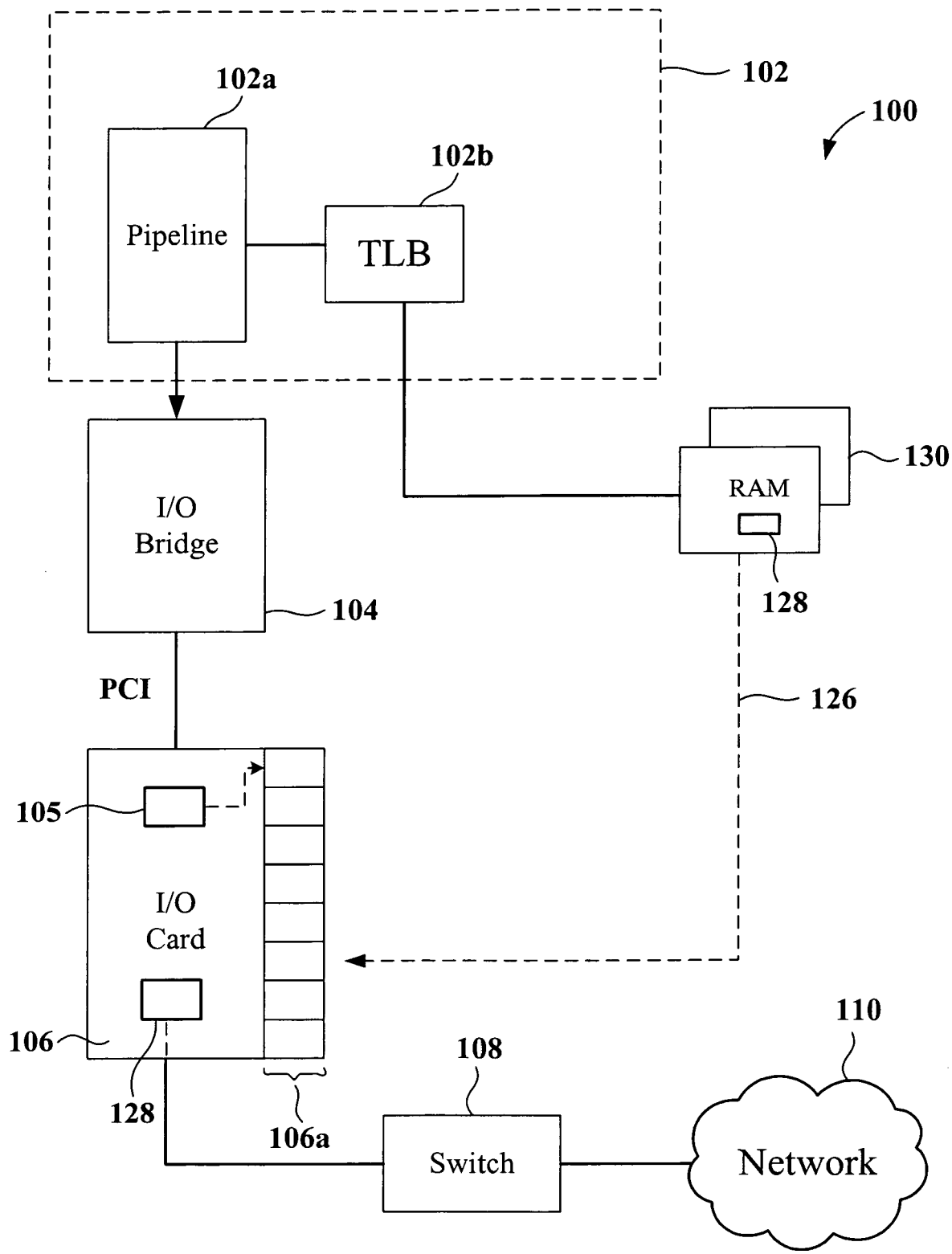
FIG. 1A illustrates a computing system in accordance with one embodiment of the present invention.

FIG. 1A illustrates a computing system 100 in accordance with one embodiment of the present invention. First, the computing system 100 is discussed and then the methodology of using the special VA to PA load instruction within the computing system 100 is described.

The computing system 100 can include a processor such as, for example, a central processing unit (CPU) 102 that can be connected to memory such as, for example, random access memory (RAM) 130. It should be appreciated that the memory may be any suitable memory such as, for example volatile memory, non-volatile memory, etc. The CPU 102, in one embodiment, includes a pipeline 102a and a translation lookaside buffer (TLB) 102b. The CPU 102 can be connected to an input/output bridge 104 which may facilitate communication between the CPU 102 and an input/output (I/O) unit 106. It should be appreciated that the I/O unit 106 may be any suitable type of device that is on chip or off chip that can facilitate data communication in any suitable type of data transmission format such as, for example, a Ethernet network interface card, an InfiniBand host bus adapter, a SCSI bus adapter, etc. In one exemplary embodiment, the I/O unit 106 can be a network interface unit (on chip) or a network interface card (NIC) that can enable communication to a network 110. In such an embodiment, the I/O unit 106 can communicate with a switch 108 which can facilitate data communication between the I/O unit 106 and a network 110.

The following describes an exemplary embodiment of a data transmission method through utilization of a special VA to PA load instruction using the computing system 100. In such an embodiment, the method may begin by assigning a virtual address (VA) to data located within the RAM 130. The VA corresponds to the physical address (PA) of the data in the RAM or any other suitable type of memory apparatus. The VA of the data may be translated to the PA explicitly in order to subsequently program another entity (e.g., an I/O unit) with the PA. In such a translation operation, the VA of the data is sent from the pipeline 102a to the translation lookaside buffer (TLB) 102b. The TLB 102b executes the VA to PA translation to determine the corresponding physical address of memory space within the RAM 130, and returns the PA to a register within the pipeline 102a.

The TLB 102b can be a hardware translation device that is configured to translate the VA to the PA of the physical location where data is to be stored. In one embodiment, the TLB 102b can be hardware that is configured to include data identifying the relationship between the virtual and physical addresses. In another embodiment, the TLB 102b may cache relationships previously utilized that identifies the virtual and physical address relationships. An exemplary TLB is discussed in further detail in reference to FIG. 1B. When a VA to PA translation is desired using the TLB 102b, the TLB 102b determines if the VA exists within the TLB 102b and if a physical address corresponding to the VA is found. If the VA is not found within the TLB 102b then a software VA to PA may be utilized or another larger translation table can be used.

Therefore, by having hardware translate the VA to PA, the PA may be obtained in a faster and more efficient manner than if large numbers of software instructions were utilized. To accomplish the VA to PA translation described above using the TLB 102b, a load instruction can be utilized. By using the load instruction, the VA of the data stored in a particular physical location of the RAM 130 (hereinafter known as source VA) is translated into a PA of the physical location (hereinafter known as a source PA). In one embodiment of the load instruction, the source PA corresponding to the source VA is loaded into a register of the CPU 102. Exemplary load instructions are discussed in reference to Table 1 and FIG. 2 below.

In one embodiment, if the VA is not found in the TLB, a least significant bit in a dummy value returned is marked to indicate that a translation was not received. Software may check the bit and if translation had failed then the translation may take place without using the TLB.

Once the translation using the TLB 102b has occurred and the source PA is exposed to the CPU 102, the CPU 102 can then program the source PA into the I/O unit 106 through the I/O bridge 104. It should be appreciated that the I/O bridge 104 may be any suitable apparatus that can facilitate data transfer between the CPU 102 and the I/O unit 106. The programming of the source PA into the I/O unit 106 can be implemented by using a store instruction as discussed below.

As described above, when data is to be transmitted from the CPU 102 to the network 110, the pipeline 102a may execute a load instruction and a store instruction as discussed below in reference to Table 1. These instructions can generate the movement of the data, as shown by arrow 126, to be sent over the network into the I/O unit 106 which can prepare the data for transmission to the network 110. In one embodiment, the I/O unit 106 may be a network interface device that is on chip or off chip that is configured for Ethernet data transmission. In such an embodiment, the I/O unit 106 may generate an Ethernet data packet with appropriate data headers so the data may be properly sent to a destination over the network 110.

It should be appreciated that the load and store instructions described above may be embodied in any type of suitable type or form of computer instruction(s). Exemplary load and store instructions that may be utilized for a data transmission operation is shown in Table 1.

TABLE 1

$ld_{VA2PA}$[VA], $r_1$
st $r_1$, [desc.ring.entry-VA]

Table 1 begins with an exemplary load instruction $ld_{VA2PA}$ [VA], $r_1$ where the virtual address is sent to the TLB and the source VA is translated to a physical address where the data is actually situated. In one embodiment, as discussed above and below, the data can be physically located in the memory space of the RAM. Once the TLB has translated the VA to PA, the PA is loaded in a register within a processor. The load instruction is described in further detail in reference to FIG. 2.

As described above, once the PA of the location of the data is obtained, a store instruction such as, for example, as shown in Table 1 may be used to store the source PA into the I/O unit. In one embodiment, the store instruction that includes an address component and a data component may be executed. The address component of the store instruction may include the virtual address of the I/O unit where the data is to be stored. Such an address component can include a VA corresponding to a physical address within a descriptor ring 106a of the I/O unit 106 (hereinafter known as a destination VA). The descriptor ring 106a may be a memory space within the I/O unit 106 that can store data. The store instruction may also include a data component which may be the source PA. Consequently, in one embodiment, the TLB 102b can receive the store instruction from the pipeline 102a and translate the destination VA to a corresponding PA within the descriptor ring 106a (hereinafter known as destination PA). Therefore, by executing the store instruction as described above, the source PA (e.g., PA 105) may be stored within the destination PA within the I/O unit 106. In one embodiment, the destination PA may be a descriptor ring within the I/O unit 106.

After the source PA has been stored at the PA of the descriptor ring, a state machine within the I/O unit 106 can access the source PA and load the data from the RAM 130 into the I/O unit 106 where the data (e.g., data 128) can be converted into whatever format desired for the data transfer to the network 110.

The methodology as described above may be adapted in another embodiment where data is received by the computing system 100. When data is received into the computing system from the network 110, a virtual address may be assigned to incoming data. This virtual address can be transmitted to the TLB for translation to a physical address of a memory space such as, for example, the RAM 130 where the incoming data is to be stored. The physical address of the memory space (e.g., data storage space) is then stored in the physical address within the I/O unit (e.g., descriptor ring). Once the data is received into the I/O unit, the state machine within the I/O unit can receive the data and process the data to remove any headers that may have been used for data transmission. Then the state machine looks at the physical address in the descriptor ring and finds the physical address of the memory space in the RAM. Then the state machine sends the data to the physical address in the RAM for storage and access by the CPU. An exemplary embodiment of data reception instructions are shown in Table 2 below:

TABLE 2

<Allocate buffer (buf.VA)>
ld$_{VA2PA}$[buf.VA], r$_1$
st r$_1$, [Rx.desc.ring_entry-VA]

Table 2 includes a program instruction for allocating a memory space such as, for example, a buffer space, where the data is to be stored and assigning a source VA for the memory space where the received data is to be stored. Then a load instruction utilizes the TLB 102a and translates the source VA to a source physical address of the RAM 130. After the load instruction, a store instruction can store the physical address of the RAM 130 into the I/O unit 106. The I/O unit 106 can then store the received data within the RAM 130. The method utilized when data is received from the network is discussed in further detail in reference to FIGS. 7 through 8.

Figure 1B:
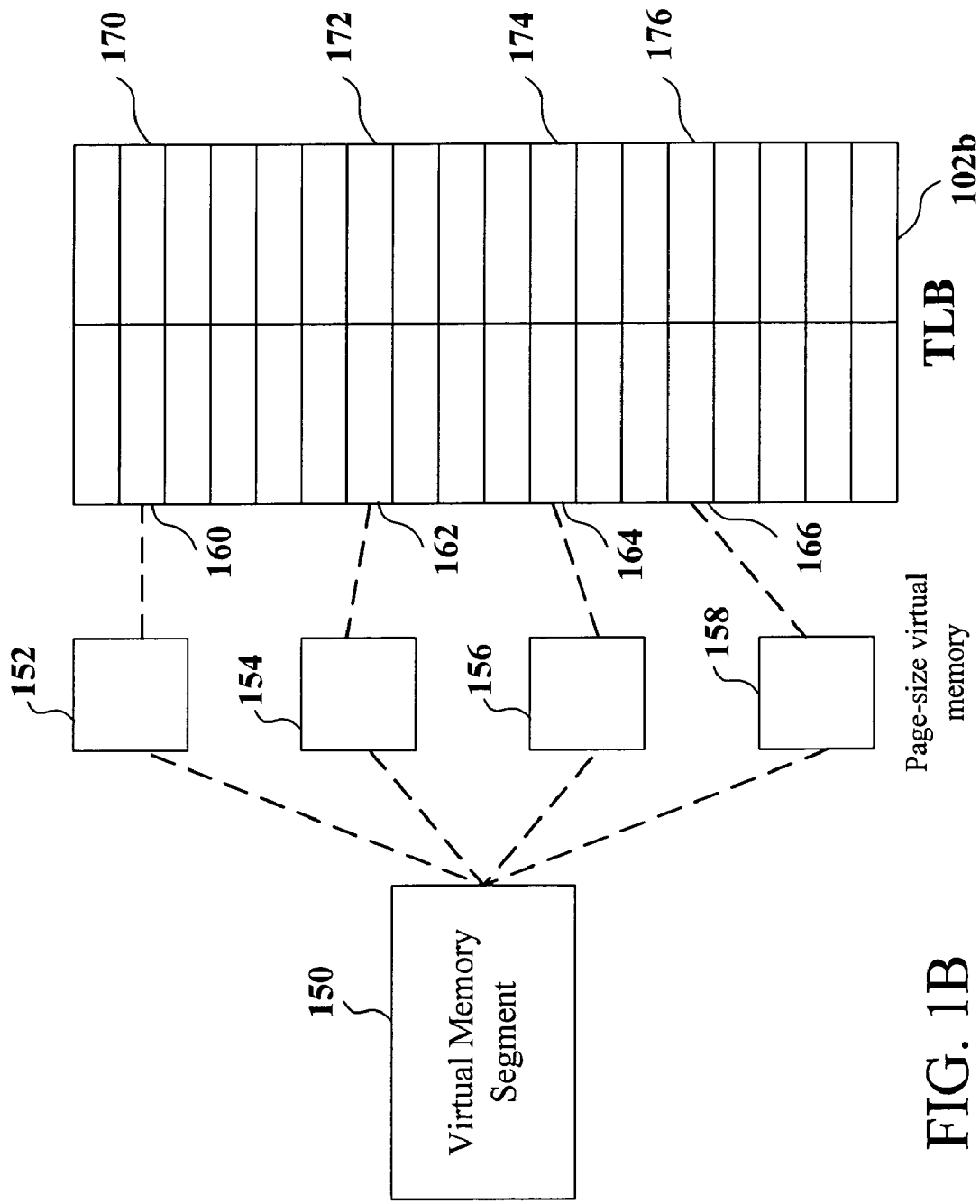
FIG. 1B illustrates a VA to PA translation using the TLB in accordance with one embodiment of the present invention.

FIG. 1B illustrates a VA to PA translation using the TLB 102b in accordance with one embodiment of the present invention. It should be appreciated that the TLB 102b may be any suitable hardware apparatus that can translate the VA to the PA consistent with the descriptions herein. As shown in FIG. 1B, a virtual memory segment 150 may include any suitable number of virtual memory pages such as, for example, memory pages 152, 154, 156 and 158. In one embodiment, virtual addresses of memory pages 152, 154, 156, and 158 may be sent to the TLB 102b for translation. When corresponding virtual memory addresses are found in the table making up the TLB 102b such as, for example, virtual addresses 160, 162, 164, and 166, the TLB 102b determines the corresponding physical addresses 170, 172, 174, and 176 within the table. In this way, the source VA may be converted into the corresponding physical address and stored in the destination PA as discussed in further detail in reference to FIG. 1A.

Figure 2:
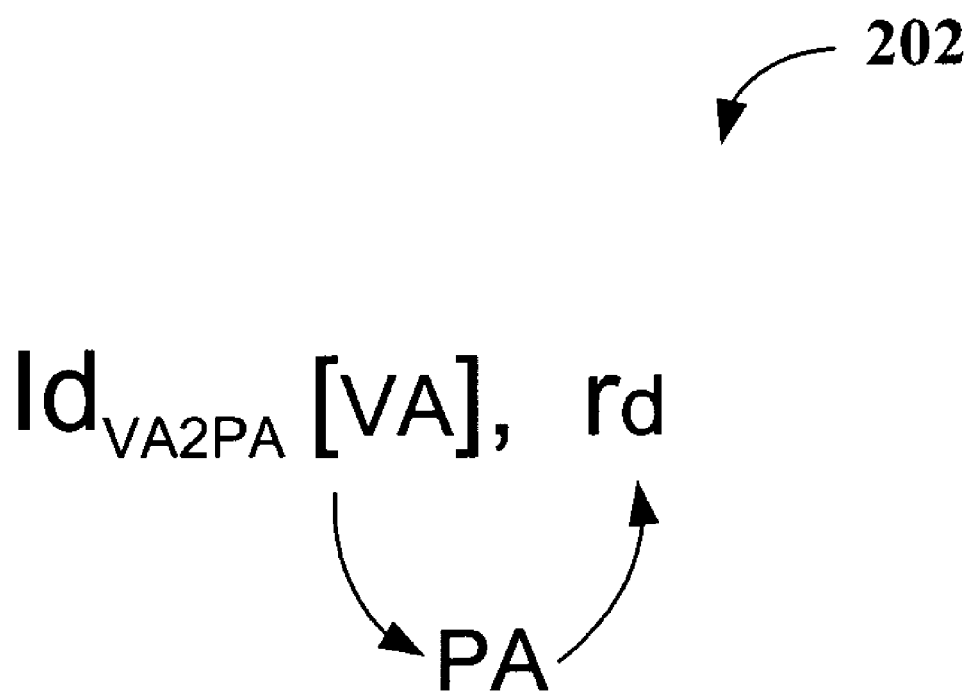
FIG. 2 illustrates a load instruction in accordance with one embodiment of the present invention.

FIG. 2 illustrates a load instruction in accordance with one embodiment of the present invention. In one embodiment of a load instruction 202 of the present invention, the VA corresponding to the physical memory space where the data is stored is translated to the PA of the memory space by the TLB 102a and therefore, the translation may be conducted in a very fast and efficient manner.

In one embodiment, the load instruction 202 initiates the transmission of the VA of the data from the pipeline to the TLB 102a. As described in reference to FIG. 1A, the hardware TLB 102 translates the data into the PA where the data is physically stored. Once the translation has taken place, the PA corresponding to the VA is returned to the pipeline as specified by the load instruction and the PA is stored within a register within the CPU 102. As a result, the time required for VA to PA translation is much lower as compared with the prior art methods. Therefore, after translation of the VA to PA, the PA of the data to be transmitted is directly stored within a designated destination register where in one embodiment, the destination register is a memory register within the CPU. The methodology of data transmission from the computing system 100 to the network 110 is discussed in further detail in reference to FIGS. 4 through 6.

Figure 3:
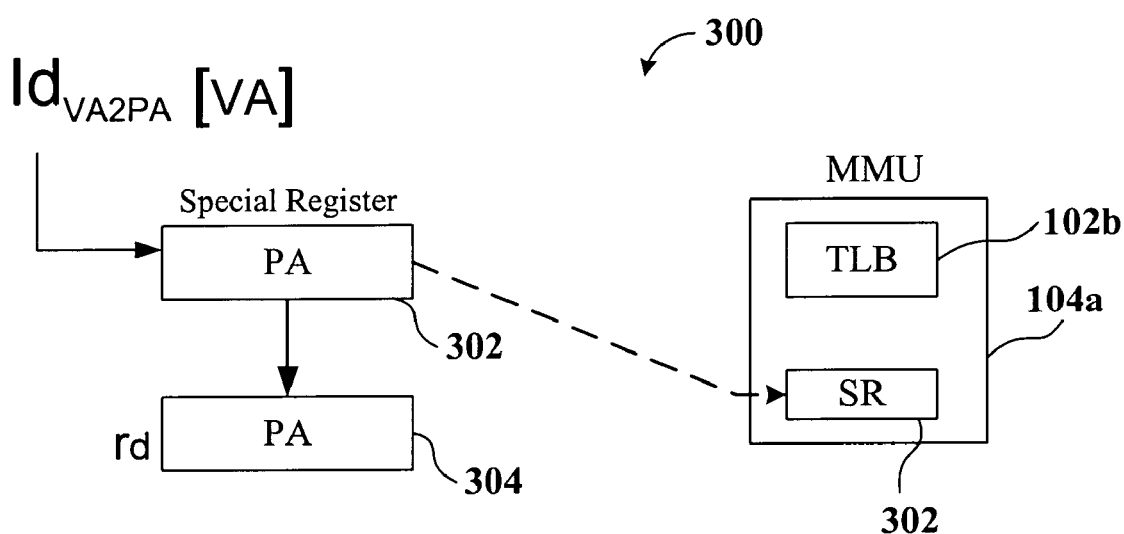
FIG. 3 illustrates an alternative VA to PA translation in accordance with one embodiment of the present invention.

FIG. 3 illustrates an alternative VA to PA translation in accordance with one embodiment of the present invention. In one embodiment, the load instruction includes an instruction to translate a VA of data to a PA of the RAM 130 (as shown in reference to FIGS. 1 and 2). Once the translation has taken place by using a TLB 102b, the PA is stored within a special register 302 within the CPU 102. In one embodiment, after the PA has been stored within the special register 302 (e.g., ASI register), the PA may be loaded into a destination register within the pipeline of the CPU 102. After that point, a store instruction may be utilized to store the PA located within the destination register to the descriptor ring of the I/O unit. After the PA has been stored within the descriptor ring, the state machine can load the data from the RAM and generate a data packet for sending to a network or a computing apparatus such as, for example, a peripheral device attached to the computing system. In such an embodiment, the disturbance to the overall design of pipeline may be lessened.

Figure 4:
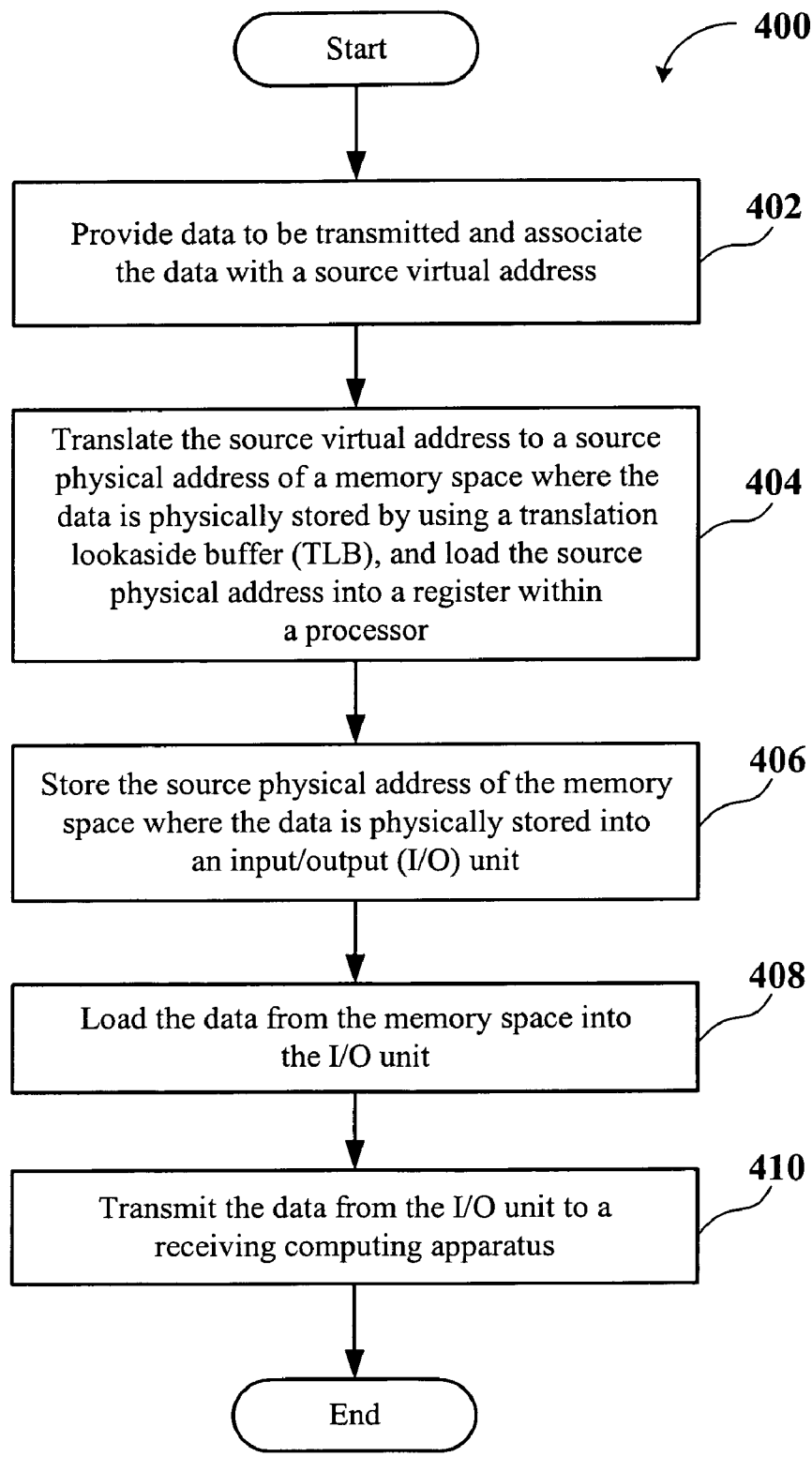
FIG. 4 illustrates a flowchart defining a method for data communication in accordance with one embodiment of the present invention.

FIG. 4 illustrates a flowchart 400 defining a method for data communication in accordance with one embodiment of the present invention. It should be understood that the processes depicted in the flowchart 400 (or the other flowcharts below) may be in a program instruction form written on any type of computer readable media. For instance, the program instructions can be in the form of software code developed using any suitable type of programming language. For completeness, the process flow of FIGS. 4 and 5 will illustrate an exemplary process whereby data is transmitted using fast VA to PA translation. The process flow of FIGS. 6 and 7 will illustrate an exemplary process whereby data is received using fast VA to PA translation.

The method begins with operation 402 where data to be transmitted is provided and the data is associated with a source virtual address. After operation 402, the method advances to operation 404 which translates the source virtual address of the data to a source physical address of a memory space where the data is physically stored by using a translation lookaside buffer (TLB). Operation 404 also loads the source physical address into a register within a processor such as, for example, a central processing unit (CPU). The memory space where the data is physically stored may be any suitable structure where data may be stored such as, for example, random access memory. After operation 404, the method moves to operation stores the physical address of the memory space where the data is physically stored into an input/output (I/O) unit. Then the method advances to operation 408 where the data from the memory space is loaded into the I/O unit such as, for example, an I/O card. After operation 408, the method moves to operation 410 which transmits the data from the I/O unit to a receiving computing apparatus. It should be appreciated that the receiving computing apparatus may be any suitable computing device(s) and/or network(s) that can receive data. In one embodiment, the receiving computing apparatus is a computing device over a network where data may be transmitted over the network to another computing device. In another embodiment, the receiving computing device may be another device within the same computer system that can utilize the data such as, for example, a cryptographic engine, a peripheral device, another component within the computing system, etc.

Figure 5:
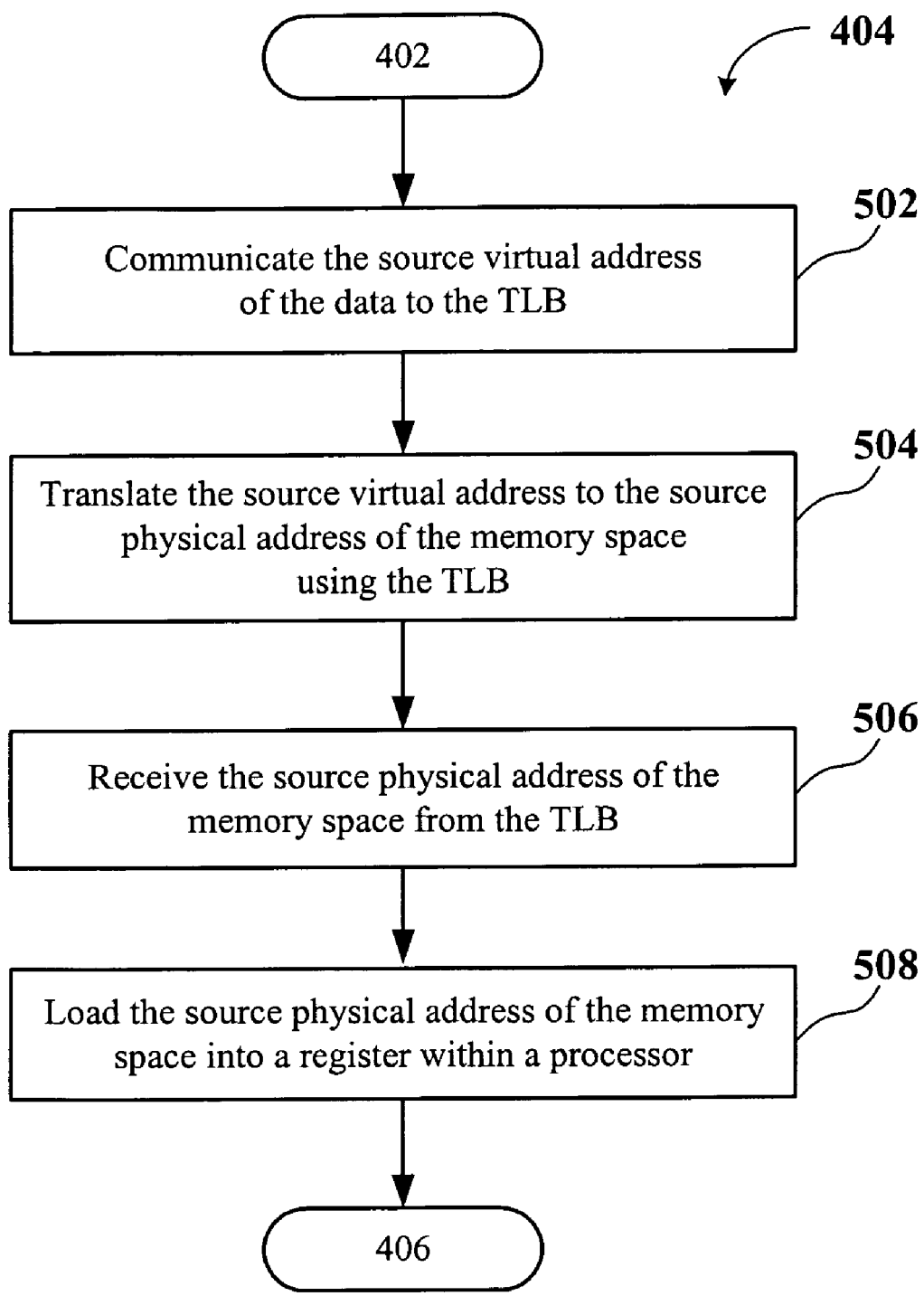
FIG. 5 illustrates a flowchart that defines the translation of the source virtual address of the data to a source physical address and further defines the loading of the source physical address into the memory buffer in accordance with one embodiment of the present invention.

FIG. 5 illustrates a flowchart 404 that defines the translation of the source virtual address of the data to a source physical address and further defines the loading of the source physical address into the memory buffer in accordance with one embodiment of the present invention. In one embodiment, after operation 402 as described FIG. 4, the flowchart 404 begins with operation 502 which communicates the source virtual address of the data to the TLB. Then the flowchart 404 advances to operation 504 which translates the source virtual address to the source physical address of the memory space using the TLB. Then the flowchart 404 proceeds to operation 506 which receives the source physical address of the memory space from the TLB. After operation 506, the method advances to operation 508 which loads the source physical address of the memory space into a register within a processor. In one embodiment, the register within a processor is a destination register within the CPU. Optionally, instead of operation 508, the physical address of the RAM may be stored into a special register as further discussed in reference to FIG. 4. After operation 508, the flowchart 404 ends by proceeding with operation 406 as discussed in further detail in reference to FIG. 4.

Figure 6:
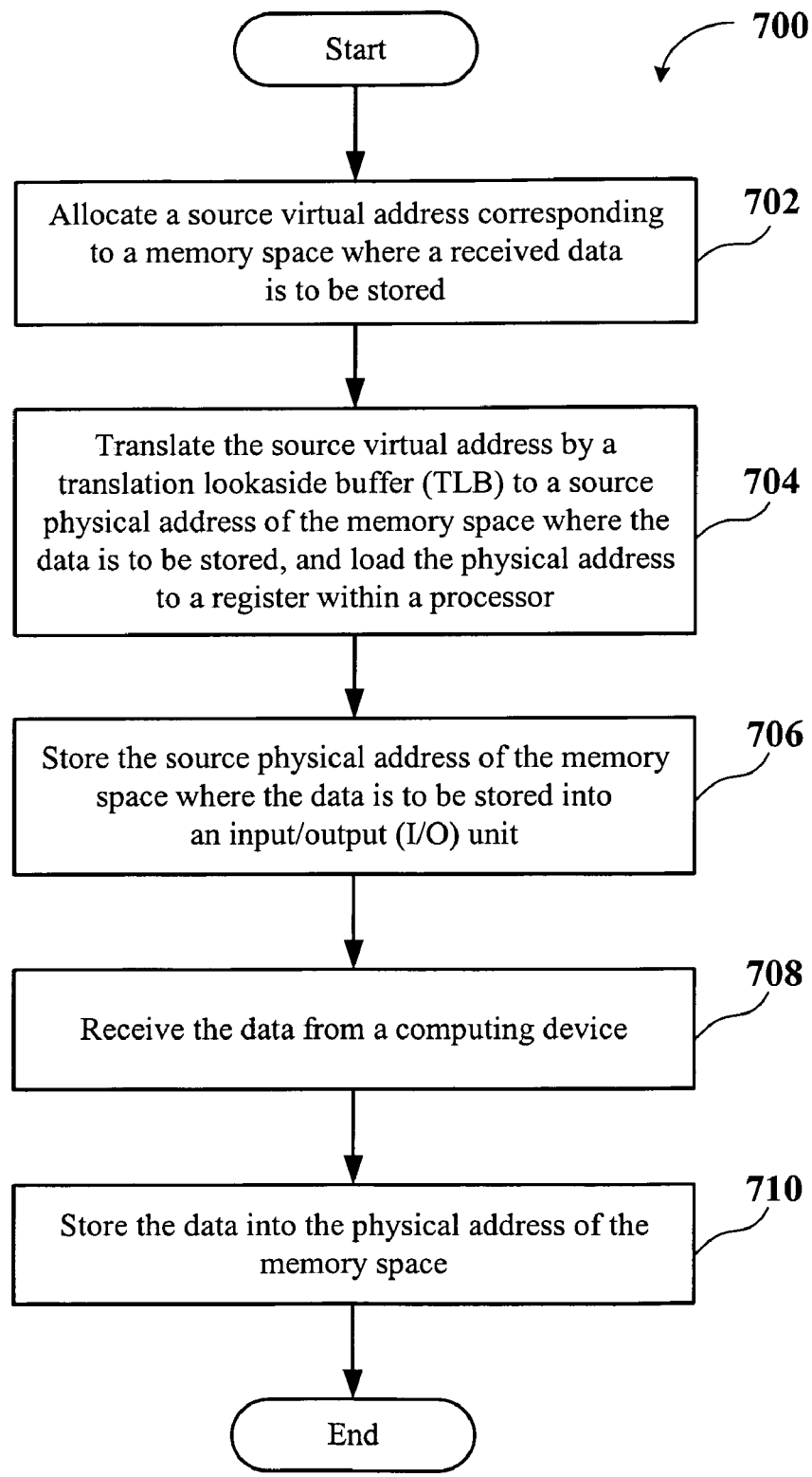
FIG. 6 illustrates a flowchart defining a method for receiving data in accordance with one embodiment of the present invention.

FIG. 6 illustrates a flowchart 700 defining a method for receiving data in accordance with one embodiment of the present invention. In one embodiment, the method begins with operation 702 which allocates a virtual address corresponding to a memory space such as, for example a buffer, where received data is to be stored. In such an embodiment, when data is received by the computing system, the memory space such as, for example, a buffer location within the RAM can be allocated so data that is received can be stored within the allocated memory space. After operation 702, the method advances to operation 704 which translates the source virtual address by a translation lookaside buffer (TLB) to a physical address of the memory space where the data is to be stored, and which loads the source physical address to a register within a processor. Then the method proceeds to operation 706 which stores the source physical address of the memory space where the data is to be stored into an input/output (I/O) unit. After operation 706, the method moves to operation 708 where data is received from a computing apparatus into the I/O unit. Then the method advances to operation 710 where the data received by the I/O unit is stored into the physical address of the memory space.

Figure 7:
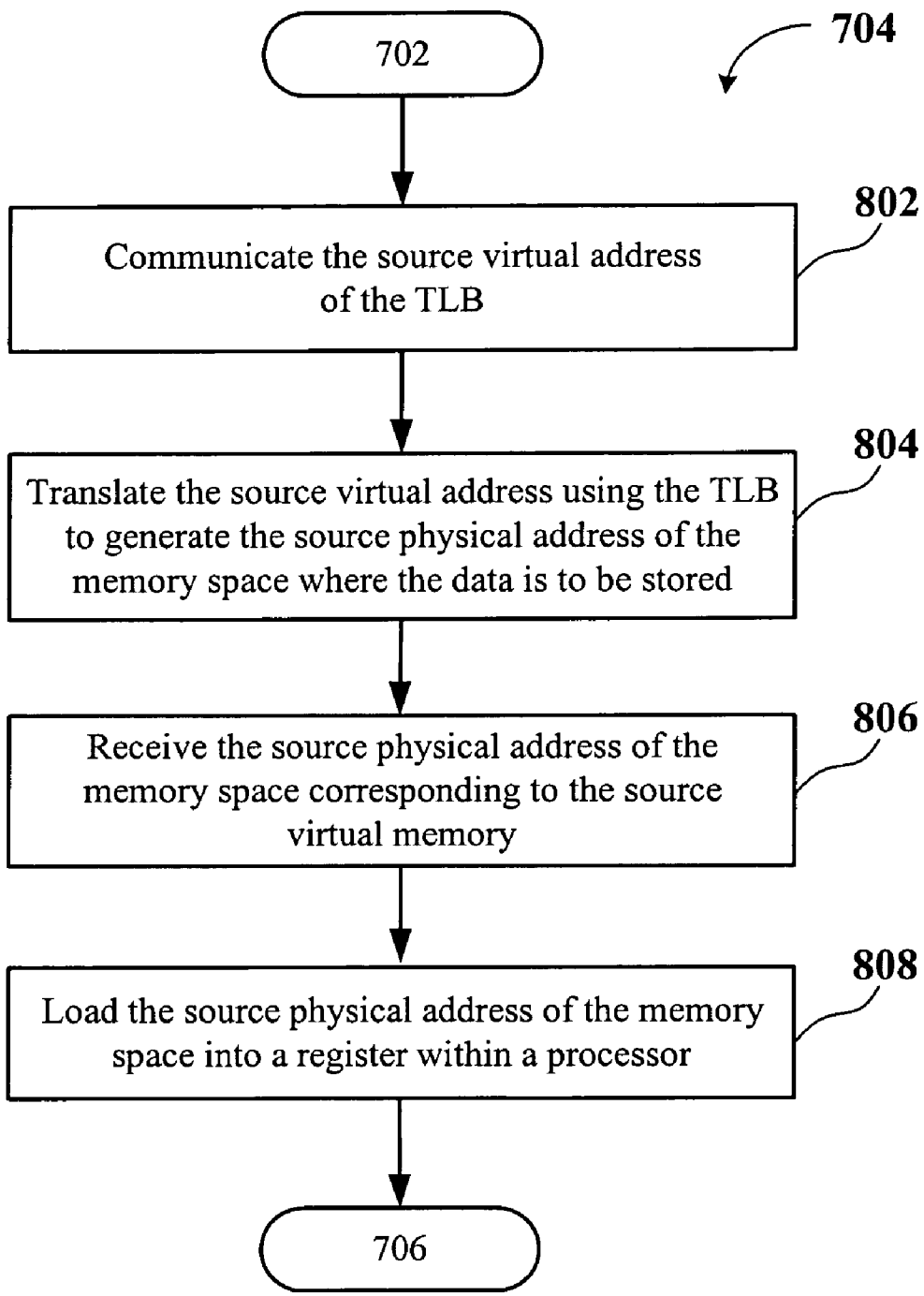
FIG. 7 illustrates a flowchart defining the translation of the source virtual address by the TLB to the source physical address of the memory space where data is to be stored and also defines the loading of the source physical address to the destination register within the CPU in accordance with one embodiment of the present invention.

FIG. 7 illustrates a flowchart 704 defining the translation of the source virtual address by the TLB to the source physical address of the memory space where data is to be stored and also defines the loading of the source physical address to the destination register within the CPU in accordance with one embodiment of the present invention. The flowchart 704 begins with operation 802 where the source virtual address of the data to be stored is communicated to the TLB. After operation 802, the flowchart 704 advances to operation 804 where the source virtual address is translated using the TLB to generate the source physical address of the memory space where the data is to be stored. Then the flowchart 704 proceeds to operation 806 where the source physical address of the memory space corresponding to the source virtual address is received. In this operation, the CPU receives the source physical address after translation. After operation 806, the flowchart 704 moves to operation 808 where the source physical address of the memory space is loaded into the register within processor.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The method described herein may also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to communicate data, comprising:
communicating a virtual address of the data to a translation lookaside buffer (TLB), the communicating originating from a processor that includes the TLB;
translating the virtual address to a physical address of a computer memory where the data is located using the TLB;
loading the physical address translated by the TLB into a register within a processor, the loading being controlled by a load instruction that identifies the physical address, as translated by the TLB, back to the processor;
loading a dummy value into the register within the processor if a translation was not received, the dummy value with a particular bit marked to indicate that a translation was not received from the TLB; and
transmitting the data from the physical address to a destination computing device.

2. A method to communicate data as recited in claim 1, wherein transmitting the data from the physical address to the destination computing device includes,
storing, in response to a store instruction, the physical address into a first memory space within an input/output (I/O) unit,
accessing the physical address to transfer the data from the computer memory to a second memory space in the input/output unit,
transmitting the data from the second memory space of the input/output unit to the destination computing device.

3. A method to communicate data as recited in claim 1, wherein the destination computing device is a cryptographic engine.

4. A method to communicate data as recited in claim 2, wherein the first memory space is a descriptor ring and the second memory space is a data storage space for storing data.

5. A method to communicate data as recited in claim 1, wherein the destination computing device is connected on a network.

6. A method to communicate data as recited in claim 2, wherein the I/O unit packages the data for data transfer.

7. A method to communicate data as recited in claim 1, wherein the TLB is an apparatus located within the processor that is configured to translate between the virtual address within a pipeline of the processor and the physical address of the computer memory.

8. A method to communicate data, comprising:
allocating a virtual address corresponding to a computer memory;
translating the virtual address to a physical address of the computer memory through a translation lookaside buffer (TLB), the translating being initiated by a load instruction of a processor of the computer and the physical address being stored in a register of the processor upon translation and receipt back from the TLB;
storing the physical address of the computer memory into a physical address of a memory space within an input/output (I/O) unit, the storing being initiated by a store instruction of the processor;
returning a dummy value to a receiving device, the dummy value with a particular bit marked to indicate that a translation was not received from the TLB;
receiving data from a sending computing apparatus; and
storing the received data to the physical address of the computer memory.

9. A method to communicate data as recited in claim 8, wherein receiving data from a sending computing apparatus includes receiving the data over a network.

10. A method to communicate data as recited in claim 8, wherein storing the received data to the physical address of the computer memory includes,
storing the received data within a data storage space in the I/O unit,
transmitting the data from the data storage space of the I/O unit to the physical address of the computer memory.

11. A method to communicate data, comprising:
providing a virtual address for the data;
translating the virtual address to a physical address of a computer memory by use of a translation lookaside buffer (TLB), the translating being initiated by a load instruction of a processor of the computer and the physical address being stored in a register of the processor upon translation and receipt back from the TLB;
returning a dummy value to a receiving device, the dummy value with a particular bit marked to indicate that a translation was not received from the TLB;
loading the physical address translated by the TLB into a register within a processor; and
storing the physical address into an input/output unit for use in data communication, the storing being initiated by a store instruction of the processor.

12. A method to communicate data as recited in claim 11, wherein storing the physical address into an input/output unit for use in data communication includes,
transmitting the physical address to the input/output unit;
storing the physical address into a descriptor ring in the input/output unit;
loading the data located in the physical address into a data storage space within the input/output unit;
transmitting the data from the data storage space to a destination computing device.

13. A method to communicate data as recited in claim 11, wherein storing the physical address into an input/output unit for use in data communication includes,
transmitting the physical address to the input/output unit;
storing the physical address into a descriptor ring in the input/output unit;
receiving the data from a computing device;
storing the received data into the physical address.

14. A method to communicate data as recited in claim 11, wherein the providing the virtual address includes allocating the virtual address.

15. The method to communicate data as recited in claim 11, wherein the receiving device is a cryptographic engine.

* * * * *